United States Patent [19]

Teramachi

[11] 4,406,502

[45] Sep. 27, 1983

[54] UNLIMITED SLIDING BALL BEARING SPLINE ASSEMBLY

[76] Inventor: Hiroshi Teramachi, 2-34-8, Higashi-Tamagawa, Setagaya-Ku, Tokyo, Japan

[21] Appl. No.: 403,035

[22] Filed: Jul. 29, 1982

[30] Foreign Application Priority Data

Aug. 6, 1981 [JP] Japan .................................. 56-123545

[51] Int. Cl.$^3$ .............................................. F16C 29/06
[52] U.S. Cl. ...................................... 308/6 C; 308/6 R
[58] Field of Search ............... 308/6 C, 6 R, 3 R, 3 A

[56] References Cited

U.S. PATENT DOCUMENTS

| | | | |
|---|---|---|---|
| 3,951,472 | 4/1976 | Schurger et al. | 308/6 C |
| 4,309,061 | 1/1982 | Teramachi | 308/6 C |
| 4,363,526 | 12/1982 | Teramachi | 308/6 C |
| 4,376,557 | 3/1983 | Teramachi | 308/6 C |

Primary Examiner—Stuart S. Levy
Assistant Examiner—Thomas R. Hannon
Attorney, Agent, or Firm—Armstrong, Nikaido, Marmelstein & Kubovcik

[57] ABSTRACT

An unlimited sliding ball bearing spline assembly comprises a cylindrical outer sleeve, a pair of cage halves and a spline shaft. The cylindrical outer sleeve has outer peripheral grooves for guiding no-load carrying balls and inner peripheral grooves for guiding load carrying balls formed longitudinally in outer and inner walls of the outer sleeve, respectively, so that the outer peripheral grooves and the inner peripheral grooves are alternated with each other in the circumferential direction of the outer sleeve, each of the inner and outer peripheral grooves being provided with ball rolling surfaces at both sides, respectively. A pair of cage half includes outer guide members each of which has an inwardly projecting partition wall at a position corresponding to the longitudinal center line of the associated outer peripheral groove of the outer sleeve, ball rolling surfaces for guiding the no-load carrying balls formed at both sides of each of the partition walls, respectively, each of the ball rolling surfaces cooperating with the adjacent one of the ball rolling surfaces formed in each of the outer peripheral grooves of the outer sleeve, and inner guide members provided with slit grooves for guiding the load carrying balls at positions coincident with the ball rolling surfaces formed in the inner peripheral grooves of the outer sleeve, respectively.

6 Claims, 10 Drawing Figures

UNLIMITED SLIDING BALL BEARING SPLINE ASSEMBLY

BACKGROUND OF THE INVENTION

1. Field of the Invention

The present invention relates in general to an unlimited sliding ball bearing spline assembly which includes a ball bearing and a spline shaft slideably supported by the ball bearing, and which allows linear relative motion between the ball bearing and the spline shaft singly or in combination with transmission of torque from the spline shaft to the ball bearing or vice versa.

The ball bearing spline assembly to the present invention enjoys wide application to spindles of various machine tools, columns and arms of industrial robots, autoloaders, spindles for spot welding machines, guide shafts for various high-speed automatic machines and the others.

2. Description of the Prior Art

The unlimited sliding ball bearing spline assemblies of the type mentioned above have heretofore been known. For example, reference may be made to Teramachi's U.S. Pat. No. 4,309,061 issued January 5, 1982. In general, the ball bearing of the ball bearing spline assembly is composed of an outer sleeve and a cage for holding therein a large number of balls grouped into a plurality of sets in each of which balls are guided as load carrying balls and no-load carrying balls along an elongated loop-like raceway track formed in substantially U-like grooves. These grooves are formed in an inner peripheral surface of a cylindrical outer sleeve of a steel material, which involves complicated and expensive machine processings. For example, preparation of the outer sleeve requires a turning work, while formation of the various longitudinal grooves requires a broaching work. A relatively large number of steps for these machine processings of the prior art provides a major cause for increasing the costs of the finished products.

Further, the cage being fitted within the outer sleeve is usually formed by press working and composed of a plurality of segments longitudinally extending and uniformly distributed in the circumferential direction of the outer sleeve, and requires much complicated and troublesome procedures upon assembling, giving rise to a possibility that the smooth relative movement between the spline shaft and the ball bearing could not be attained due to errors possibly involved in the assembling.

Besides, since a rotational direction changing groove for transferring the balls from the load-carrying ball zone to the no-load carrying ball zone or vice versa is located at a joint portion between the outer sleeve and/or the cage and an end cover plate, even a slight mechanical and mounting error produced at the joint portion provides resistance to the smooth rolling of the balls and/or a cause for generation of noise.

SUMMARY OF THE INVENTION

An object of the present invention is to provide an unlimited sliding ball bearing spline assembly which is substantially immune to the drawbacks described above.

Another object of the present invention is to provide a ball bearing spline assembly which can be manufactured and assembled in a much simplified manner without requiring machine working or processing for forming the ball guide grooves in the outer sleeve.

Still another object of the present invention is to provide a ball bearing spline assembly in which end plate members of a cage are integrally formed with a ball holding member of the cage.

A further object of the present invention is to provide a ball bearing spline assembly in which the balls can roll smoothly along the closed loop-like raceway tracks without generating noise.

A still further object of the invention is to provide a ball bearing spline assembly which is capable of withstanding radial load of great magnitude and transmitting large torque.

In view of the above and other objects which will become more apparent as description proceeds, there is provided according to a general aspect of the present invention a ball bearing spline assembly which comprises a cylindrical outer sleeve having outer peripheral grooves for guiding no-load carrying balls and inner peripheral grooves for guiding load carrying balls formed longitudinally in outer and inner walls of the outer sleeve, respectively, so that the outer peripheral grooves and the inner peripheral grooves are alternated with each other in the circumferential direction of the outer sleeve, each of the inner and outer peripheral grooves being provided with ball rolling surfaces at both sides, respectively. The ball bearing spline assembly further includes a pair of cage halves, each including outer guide members each of which has an inwardly projecting partition wall at a position corresponding to the longitudinal center line of the associated outer peripheral groove of the outer sleeve, ball rolling surfaces for guiding the no-load carrying balls formed at both sides of each of the partition walls, respectively, each of the ball rolling surfaces cooperating with the adjacent one of the ball rolling surfaces formed in each of the outer peripheral grooves of the outer sleeve, and inner guide members provided with slit grooves for guiding the load carrying balls at positions coincident with the ball rolling surfaces formed in the inner peripheral grooves of the outer sleeve, respectively. The outer and inner guide members project longitudinally from a base portion of the cage half with a predetermined space therebetween. The pair of cage halves are connected together in an end abutting relation to constitute a cage unit. A spline shaft is slideably inserted in a bore defined by the inner guide members of the cage unit and has a plurality of longitudinally protrusions adapted to be received, respectively, in a corresponding number of recesses space defined by each rows of balls held within the slit grooves of the cage unit.

The above and other objects, novel features and advantages of the present invention will be more readily understood from the following description of preferred embodiments thereof. The description makes reference to the accompanying drawings.

DETAILED DESCRIPTION OF THE PREFERRED EMBODIMENTS

Now, the invention will be described in conjunction with a preferred embodiment thereof by referring to the accompanying drawings.

Figure 1:
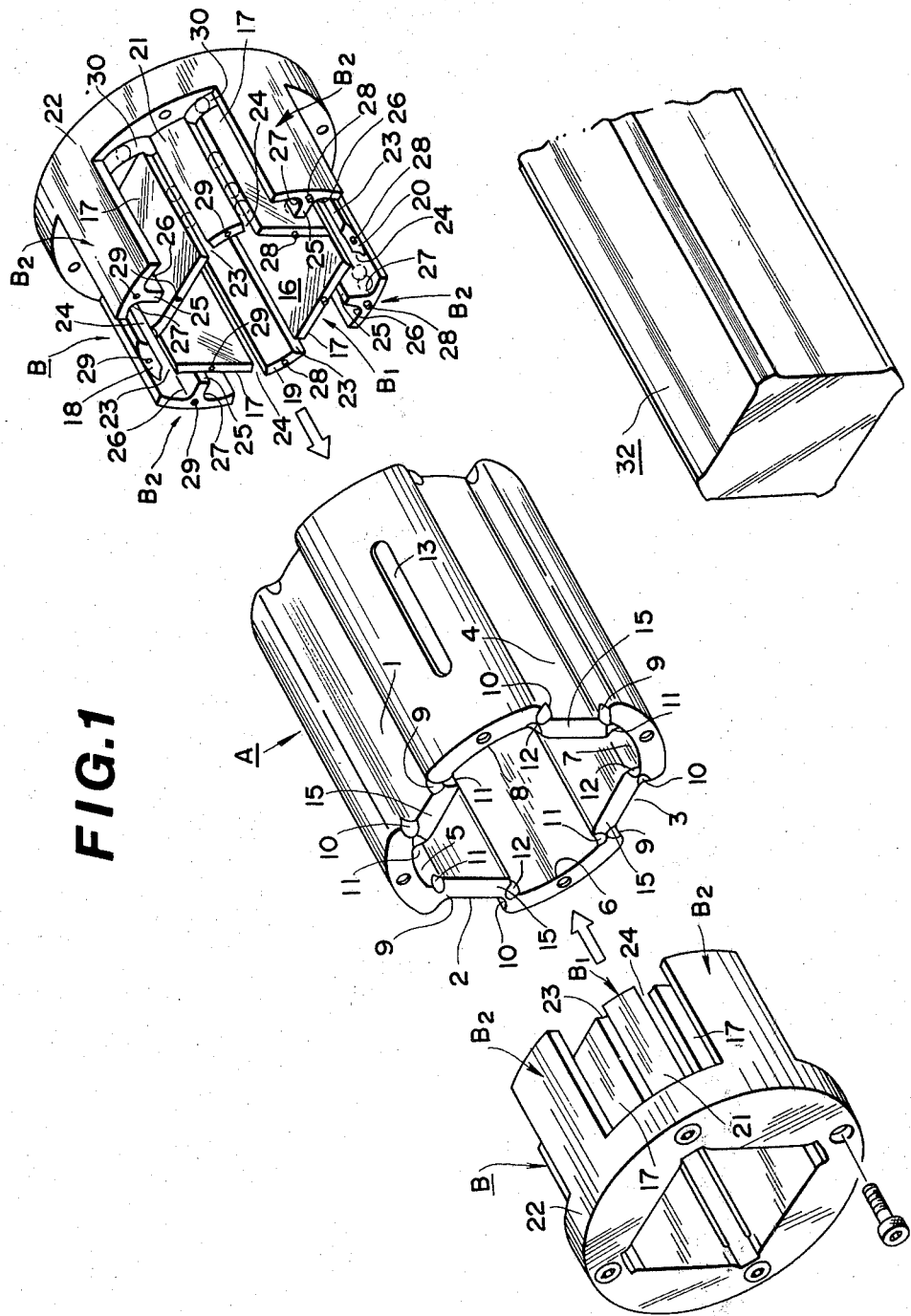
FIG. 1 is an exploded perspective view showing an outer sleeve, a pair of cage halves and a spline shaft constituting an unlimited sliding ball bearing spline assembly according to a first embodiment of the invention.
Figure 2:
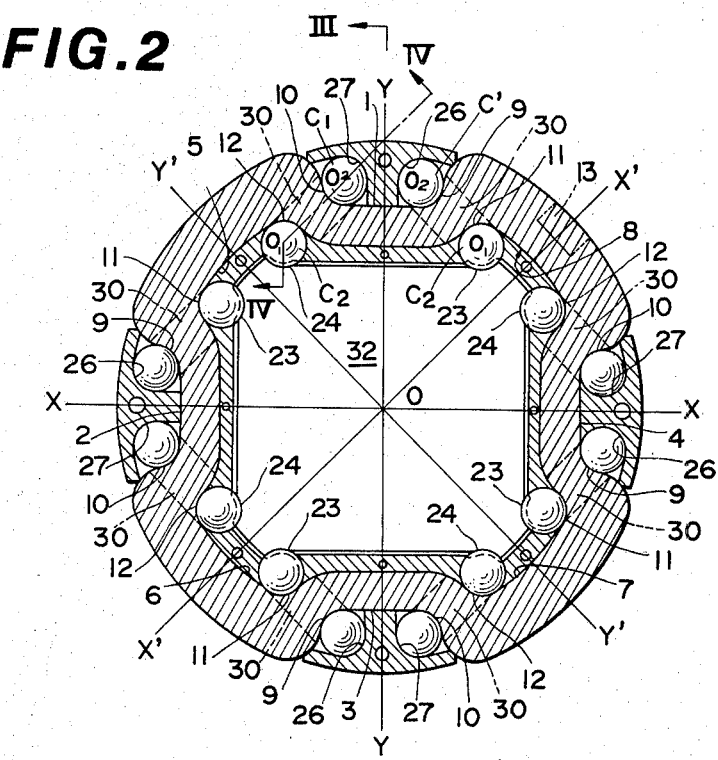
FIG. 2 is a cross-sectional view taken at a mid portion of the ball bearing spline assembly in the assembled state.
Figure 3:
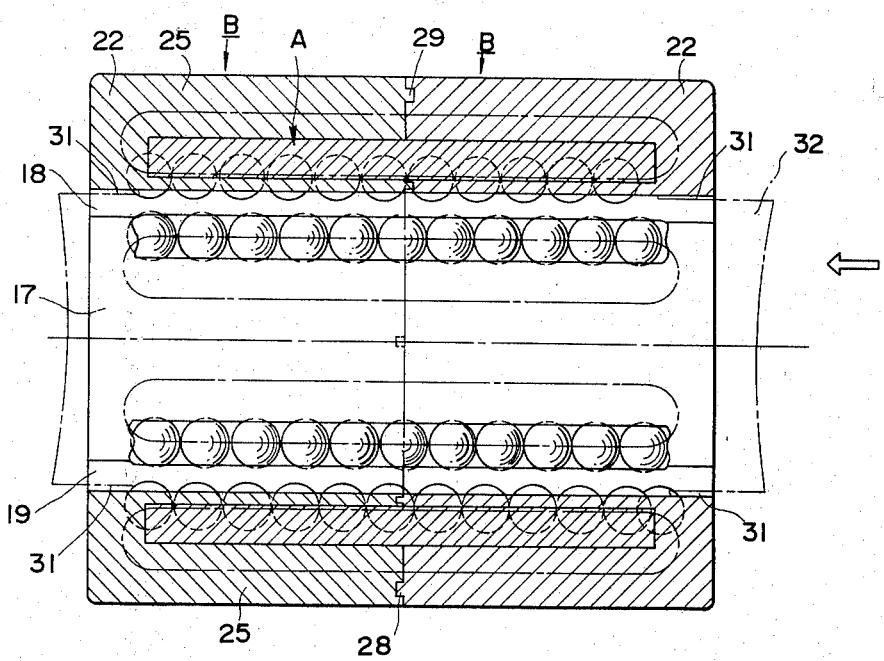
FIG. 3 is a longitudinal sectional view of the same assembly taken along line III—III in FIG. 2.

Referring first to FIG. 1, an unlimited sliding ball bearing spline assembly according to the present invention is essentially composed of a cylindrical outer sleeve generally denoted by a reference letter A, a pair of cage halves B having an identical structure and adapted to be connected together in an end abutting relation to thereby constitute a cage unit or holder generally denoted by B, plural sets (eight sets in the case of the illustrated embodiments) of balls C (not shown in FIG. 1) adapted to roll in respective recircular track defined between the outer sleeve A and the cage unit or holder B, and a spline shaft 32. The cylindrical outer sleeve A made of a quenchable steel material through shaping press or draw working in a uniform wall thickness have outer peripheral grooves 1, 2, 3 and 4 and inner peripheral grooves 5, 6, 7 and 8 each of substantially U-like cross-section. The outer peripheral grooves 1, 2, 3 and 4 and the inner peripheral grooves 5, 6, 7 and 8 are formed in the outer and the inner surfaces of the outer sleeve A so that it is alternated with each other as viewed in the circumferential direction thereof, and extend in the longitudinal direction of the outer sleeve A. The outer peripheral grooves 1, 2, 3 and 4 are adapted to guide the no-load carrying balls $C_1$, while the inner peripheral grooves 5, 6, 7 and 8 are adapted to guide the load carrying balls $C_2$ serving for torque transmission, as will hereinafter be described in detail. To this end, each of the outer peripheral grooves 1, 2, 3 and 4 is provided with ball rolling surfaces 9 and 10 at both sides thereof, each of the rolling surfaces having a curvature approximately equal to that of the ball C. In the similar manner, each of the inner peripheral grooves 5, 6, 7 and 8 is provided with ball rolling surfaces 11 and 12 at both sides thereof, each of the rolling surfaces having the curvature substantially corresponding to that of the ball C. Referring to FIG. 2, it will further be noted that outer peripheral grooves 1, 2, 3 and 4 are disposed symmetrically relative to a horizontal bisector line X and a vertical bisector line Y which orthogonally intersect each other at the longitudinal center axis O of the outer sleeve A, while the inner peripheral grooves 5, 6, 7 and 8 are also formed in a symmetrical array relative to bisector lines X' and Y' inclined at 45° from the horizontal and the vertical lines X and Y, respectively.

Figure 4:
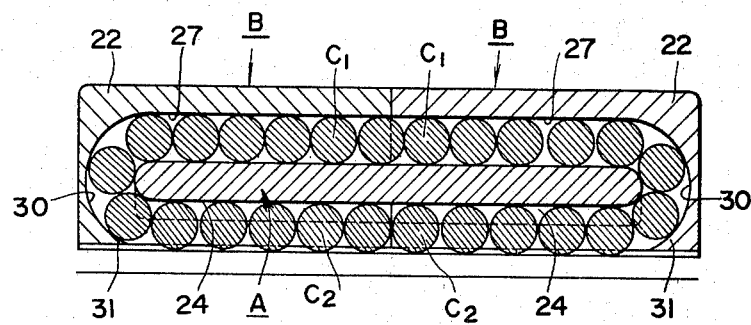
FIG. 4 is a sectional view taken along line IV—IV in FIG. 2.

Describing a positional and operational relationship between the ball rolling surfaces 9;10 formed in each of the outer peripheral grooves 1, 2, 3 and 4 and the ball rolling surfaces 11;12 formed in each of the inner peripheral grooves 5, 6, 7 and 8 by taking as examples the outer peripheral groove 1 bisected by the vertical line Y and the adjacent inner peripheral grooves 5 and 8 bisected by the inclined lines X' and Y', respectively, it is important to note that the righthand side ball rolling surface 9 of the outer peripheral groove 1 as viewed in FIG. 2 cooperates with the lefthand side ball rolling surface 11 of the inner peripheral groove 8 to constitute a closed loop rolling track along which a set of balls C are recirculated, while the lefthand side ball rolling surface 10 of the outer peripheral groove 1 as viewed in FIG. 2 is combined with the righthand side ball rolling surface 12 of the inner peripheral groove 5 to define another closed loop rolling track along which another set of the balls C are recirculated, as is illustrated in FIG. 4. The same applies to the relationship between the adjacent ball rolling surfaces (9, 11; 10, 12) of other outer and inner peripheral grooves located adjacent to each other.

Referring again to FIG. 1, reference numeral 13 denotes a key recess useful for mounting or connecting the ball bearing spline assembly to other structure or the like purposes.

Each of the holder or cage halves B serving in combination for guiding the rolling of the load carrying balls $C_2$ and the no-load carrying balls $C_1$ is integrally formed by a die-cast forming, resin moulding or precision casting. The cage halves B are adapted to be snugly fitted in the outer sleeve A from both ends thereof in close contact with the inner and outer peripheral surfaces of the outer sleeve A to be connected together at a mid portion in an end abutting relation. To this end, each of the cage halves B includes inner guide members $B_1$ of a substantially rectangular form adapted to be brought into intimate contact with the inner flat surfaces 15 and inner peripheral grooves 5, 6, 7 and 8 of the outer sleeve A, and outer guide members $B_2$ of a subtantially T-like cross-section adapted to be snugly engaged with the outer peripheral grooves 1, 2, 3 and 4 of the outer sleeve A. The inner guide members $B_1$ include four plate elements 17 extending from a base portion 22 in the longitudinal direction of the cage half B in a substantially square array symmetrical to the horizontal and the vertical lines X and Y shown in FIG. 2. The plate elements 17 which have a substantially rectangular form of the length corresponding to that of the cage half B and contact with each of inner flat surfaces 15 of the outer sleeve A formed between the adjacent inner peripheral grooves 5, 6, 7 and 8, respectively, define a substantially square space or bore 16 in which the spline shaft 32 is slideably inserted and accommodated. The inner guide members $B_1$ includes further four corner slant plates 18, 19, 20 and 21 disposed at corner positions of the bore 16, respectively, each of corner slant plates having a substantially same width as that of the inner peripheral grooves 5, 6, 7 and 8 so that these corner plates 18, 19, 20 and 21 are snugly fitted in the inner peripheral grooves 5, 6, 7 and 8, respectively. The slanted corner plates 18, 19, 20 and 21 also extend from the base portion 22 of the cage half B in the longitudinal direction thereof and in parallel with one another in a symmetrical relationship relative to the lines X' and Y' shown in FIG. 2. In this connection, it should further be noted that slit grooves 23 and 24 are formed between each of the slanted corner plate elements 18, 19, 20 and 21 and the adjacent flat plate elements 17, respectively, wherein each of the slit grooves 23 and 24 have a curvature of a radius substantially equal to the radius of the ball C and is provided with a longitudinal slit of a width smaller than the diameter of the ball C so that the load carrying balls $C_2$ may not fall out from the groove 23 and 24 (also refer to FIG. 2).

On the other hand, the four outer guide members $B_2$ of the substantially T-like cross-section has a depending partition wall 25 integrally extending along a longitudinal center line of the outer guide member, the partition wall 25 being separated from the flat plate member 17 mentioned above at a distance substantially equal to the wall thickness of the outer sleeve A. Thus, when the outer sleeve A and the cage halves B are assembled, the depending partition walls 25 are located, respectively, on the longitudinal center lines of the outer peripheral grooves 1, 2, 3 and 4 and thus on the horizontal line X and the vertical line Y shown in FIG. 2, wherein there are formed on both sides of each of the partition walls 25 at a base portion thereof ball rolling surfaces 26 and 27 of semi-circular cross-section which define the rolling tracks for the no-load carrying balls $C_1$ in cooperation with the ball rolling surfaces 9 and 10, respectively, which are provided in the outer sleeve A. Needless to say, the inner surfaces of the ball rolling surfaces 26 and 27 have a curvature of the radius substantially equal to that of the ball C.

Here, it is assumed that the center of the circles defined by the slit grooves 23 and 24 for the load carrying balls $C_2$ is represented by $O_1$, while the center of the circle defined by the ball rolling surfaces 26 and 27 for the no-load carrying balls $C_1$ is represented by $O_2$. Then, it will be seen that difference in radial distance between the center O of the outer sleeve A and the center $O_1$ on one hand and between the sleeve center O and the center $O_2$ on the other hand corresponds substantially to the radius of the ball C. In other words, the centers $O_1$ and $O_2$ defined above are located relatively close to each other.

Figure 6:
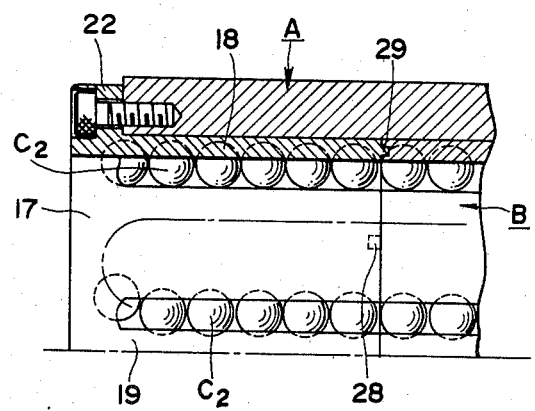
FIG. 6 is a sectional view taken along line VI—VI in FIG. 5.

As described hereinbefore, the pair of the cage or holder halves B;B, each of the identical structure, are fitted in the outer sleeve A from both ends thereof in the end abutting manner to be connected together at the mid portion of the outer sleeve A. To this end, there are formed positioning or engaging pins 28 and holes 29 alternately at the opposing ends of the inner guide members $B_1$ and the outer guide members $B_2$ of the cage halves B, so that the pins 28 provided in one of the cage or holder half B may engage in the holes 29 of the other cage half B. Reference is also to be made to FIG. 6.

Referring to FIG. 4, there is formed in the inner wall of the cylindrical base portion 22 of each cage half B ball rotational direction changing grooves 30 for communicating the slit grooves or the load carrying ball grooves 23 and 24 to the no-load carrying ball grooves 9, 10, 26 and 27, respectively, (also refer to FIG. 2) to thereby allow the rotational direction of the balls to be changed from the zone of the load carrying balls $C_2$ toward the zone of the no-load carrying balls $C_1$ or vice versa. Reference numerals 31 denotes a tongue formed in each of the ball rotational direction changing groove 30 at the side of the load carrying ball zone for scooping up the load carrying balls $C_2$ which are to be transferred to the zone of the no-load carrying balls $C_1$.

Figure 5:
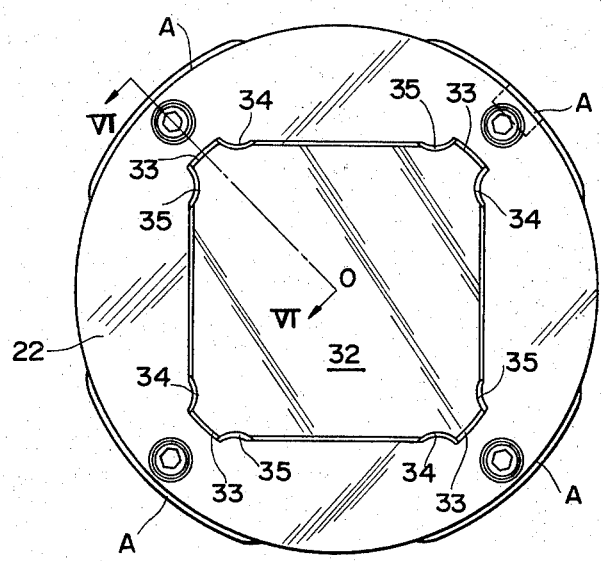
FIG. 5 is an end elevational view as viewed in the direction indicated by a hollow arrow in FIG. 3.

Next, referring to FIGS. 1, 2, 3 and 5 in particular, there is slideably inserted in the bore 16 defined by the inner guide members $B_1$ of the cage the spline shaft 32 which has a square cross-section substantially coinciding with that of the inner bore 16. The spline shaft 32 has at least a length which permits all the longitudinal rows of the load carrying balls $C_2$ to be rolled, and is provided with ridge portions 33 each at a corner of the spline shaft 32. As can be seen in FIGS. 1, 2, and 5, there are formed at both side walls of the ridge portion 33 ball rolling surfaces 34 and 35, each of the rolling surfaces having a radius of curvature substantially equal to the radius of the ball C, wherein each of the ridge portions 33 is held as sandwiched within a recess space defined by the each rows of load carrying balls $C_2$ rolling on the ball rolling surfaces 11 and 12, respectively, of the outer sleeve A.

In the unlimited sliding ball bearing spline assembly of the structure disclosed in the foregoing, when the spline shaft 32 is moved in the longitudinal direction while being rotated in one direction, the balls C located within the cage B, i.e. the load carrying balls $C_2$ for torque transmission, move with rolling in the load carrying ball grooves 23 and 24, respectively, to be put in rolling contact between the ball rolling surfaces 34 and 35 formed in each ridge portion of the spline shaft 32 and the ball rolling surfaces 11 and 12 of the outer sleeve A. When the load carrying balls $C_2$ are scooped by the tongues 31 projecting into the load carrying ball grooves 23 and 24, the load carrying balls $C_2$ are turned in its moving direction from linear to circular track by the ball rotational direction changing grooves 30, whereby the balls $C_2$ are transferred to the no-load carrying ball grooves 9, 10, 26 and 27 and the balls $C_2$ get rid of load. In this manner, the balls C are caused to circulate along the load carrying ball grooves 23 and 24 and the no-load carrying ball grooves 9, 10, 26 and 27, respectively, in a closed loop, whereby the same ball C functions as the load carrying ball $C_2$ or the no-load carrying ball $C_1$.

Figure 7:
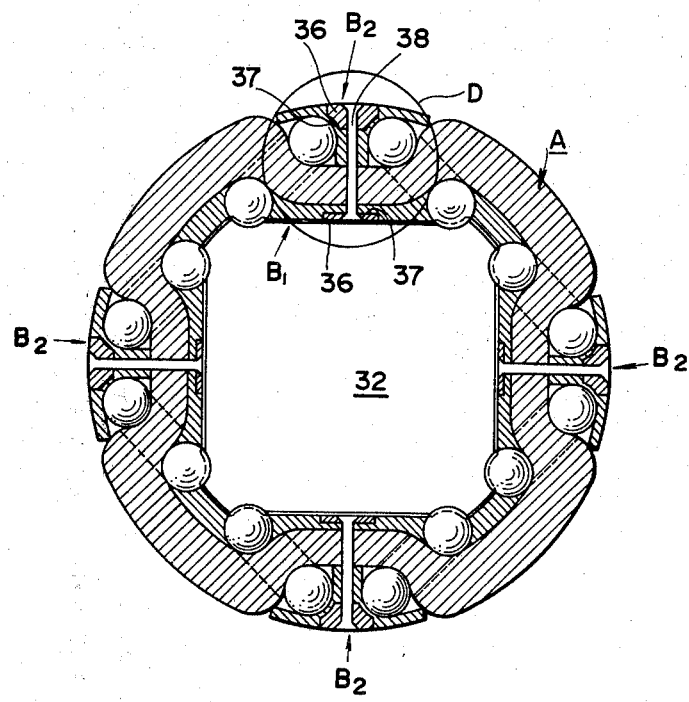
FIG. 7 is a view similar to FIG. 2 and shows a second embodiment of the invention.
Figure 8:
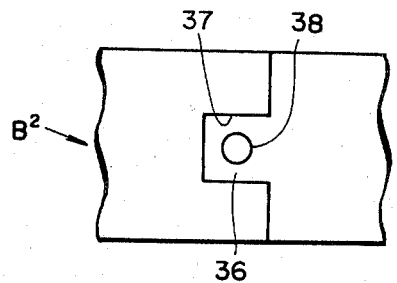
FIG. 8 is a fragmental top plan view of a portion shown as enclosed by a circle in FIG. 7.
Figure 9:
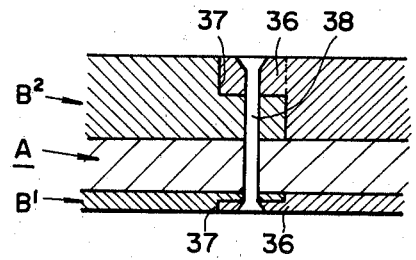
FIG. 9 is a fragmental longitudinal sectional view of the same portion.
Figure 10:
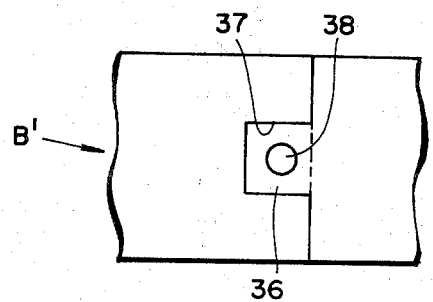
FIG. 10 is a fragmental bottom plan view of the same.

FIGS. 7 to 10 shows another embodiment of the present invention which differs from the first embodiment described above in the coupling structure of the cage halves at the mid portion of the bearing assembly. In FIGS. 7 and 10, parts same as or equivalent to those shown in FIGS. 1 to 6 are denoted by like reference symbols. It will be seen from FIGS. 7 to 10 that engaging projections 36 and engaging grooves 37 are formed in the free end portions of the inner guide members $B_1$ and the outer guide members $B_2$, respectively, in a manner similar to a dovetail joint, wherein the engaging projections 36 of one of the cage halves are engaged in the grooves of the other cage halves. The mid connecting portion of the cage joined together are rigidly connected by rivets 38 to the outer sleeve A. When the cage or holder B is formed of a synthetic resin, the opposite free end portions of the cage halves may be coupled together by using a plastic welder.

With the structure of the unlimited sliding ball bearing spline assembly according to the present invention, the ball rolling surfaces of the inner and outer peripheral grooves of the outer sleeve can be advantageously formed integrally with the outer sleeve through press shaping without requiring formation of the U-like guide grooves by broaching as is the case of the prior art. Further, since the no-load carrying balls grooves can be realized by the combinations of the outer peripheral grooves of the outer sleeve and the outer guide members of the cage, there is required no broaching process, involving reduction in the manufacturing costs.

By virtue of the feature that the little difference in radial distance between the axial center of the outer sleeve and that of the load carrying balls on one hand and that of the no-load carrying balls on the other hand, the outer diameter of the outer sleeve can be reduced to thereby permit the bearing assembly of a compact design and a small size to be realized. Besides, due to the feature mentioned above, the influence of a centrifugal force produced upon rotation at a high speed can be suppressed to minimum.

Because the width of the longitudinal slit formed in each of the load carrying ball grooves of the cage is smaller than the diameter of the ball, there is no danger that the balls might fall out from these grooves even when the spline shaft is completely withdrawn. Thus, the assembling, maintenance and inspection of the inventive ball bearing spline assembly can be extremely facilitated. Additionally, the arrangment in which each of the ridge portions of the spline shaft is held between the each rows of the load carrying balls allows a preload to be applied in a rotational direction, whereby the rigidity as well as the use life of the ball bearing spline assembly can be significantly increased. Further, since the ball rolling surfaces have the substantially same radius of curvature as that of the ball, the contact area of the ball can be increased, whereby the ball bearing spline assembly can transmit increased torque and withstand large radial loads, to further advantages.

In the foregoing description, it has been assumed that four inner peripheral grooves are formed in the inner wall of the outer sleeve and that the spline shaft has correspondingly four ridges. It goes however without saying that the invention is never restricted to such number, but the spline shaft may be provided with six, eight or more ridges, as applications require.

The invention has been described in conjunction with the exemplary embodiments shown in the accompanying drawings. It should however be noted that modifications and variations of the disclosed structure may readily occur to those skilled in the art without departing from the spirit and scope of the invention.

What is claimed is:

1. A ball bearing spline assembly comprising:
a cylindrical outer sleeve having outer peripheral grooves for guiding no-load carrying balls and inner peripheral grooves for guiding load carrying balls formed longitudinally in outer and inner walls of said outer sleeve, respectively, so that said outer peripheral grooves and said inner peripheral grooves are alternated with each other in the circumferential direction of said outer sleeve, each of said inner and outer peripheral grooves being provided with ball rolling surfaces at both sides, respectively,
a pair of cage halves, each cage half including outer guide members each of which has an inwardly projecting partition wall at a position corresponding to the longitudinal center line of the associated outer peripheral groove of the outer sleeve, ball rolling surfaces for guiding the no-load carrying balls formed at both sides of each of said partition walls, respectively, each of said ball rolling surfaces cooperating with the adjacent one of said ball rolling surfaces formed in each of said outer peripheral grooves of the outer sleeve, and inner guide members provided with slit grooves for guiding the load carrying balls at position coincident with said ball rolling surfaces formed in said inner grooves of said outer sleeve, respectively, and said outer and inner guide members projecting longitudinally from a base portion of said cage half with a predetermined space therebetween, said pair of cage halves being connected together in an end abutting relation to constitute a cage unit; and
a spline shaft slideably inserted in a bore defined by said inner guide members of the cage unit and having a plurality of longitudinal protrusions adapted to be received, respectively, in a corresponding number of recesses space defined by each rows of balls held within said slit grooves of said cage unit.

2. A ball bearing spline assembly according to claim 1, wherein difference in radial distance between the center axis of said outer sleeve and that of said no-load carrying ball and between the center axis of said outer sleeve and that of said load carrying ball is smaller than radius of said ball.

3. A ball bearing spline assembly according to claim 1, wherein each of said longitudinal protrusions of said spline shaft is sandwiched between each of the rows of the load-carrying balls.

4. A ball bearing spline assembly according to claim 1, wherein each of said outer peripheral grooves for guiding the no-load carrying balls is communicated to the adjacent inner peripheral groove for guiding the load carrying balls through a rotational direction changing groove formed in said base portion of each of said cage halves.

5. A ball bearing spline assembly according to claim 4, wherein said rotational direction changing groove is provided with a ball scooping means for allowing smooth transfer of the balls between the load carrying balls grooves and the no-load carrying balls grooves.

6. A ball bearing spline assembly according to claim 1, said cage halves being adapted to be connected together at a mid position of said assembly, wherein opposite free ends of said outer and inner guide members of said cage halves are provided with complementary engaging means.

* * * * *